Nov. 24, 1936.    W. L. MORRALL    2,061,586
MULTIPLE SPINDLE SCREW MACHINE
Filed Aug. 15, 1930    8 Sheets-Sheet 6

Nov. 24, 1936.  W. L. MORRALL  2,061,586
MULTIPLE SPINDLE SCREW MACHINE
Filed Aug. 15, 1930  8 Sheets-Sheet 8

Inventor
William Lloyd Morrall
by Popp & Powers
Attorneys

Patented Nov. 24, 1936

2,061,586

UNITED STATES PATENT OFFICE 2,061,586

MULTIPLE SPINDLE SCREW MACHINE

William Lloyd Morrall, Buffalo, N. Y.

Application August 15, 1930, Serial No. 475,420

11 Claims. (Cl. 29—36)

This invention relates to an automatic, multiple, hollow-spindle lathe or "screw machine" in which relatively long pieces or lengths of rods or bar stock are fed into the bores of a plurality of hollow spindles and are suitably machined and cut off at the front end of said spindles to form unthreaded nuts and other screw machine products.

The object of the invention is, in general, to provide a screw machine of this character which has a maximum production with a minimum length of time required for set-ups and shut-downs. The specific objects of the invention are: (1) to provide an improved method of actuating the forming and cut-off tools and the indexing mechanism; (2) to use forming tools for forming only and to use separate cut-off tools for cutting operations; (3) to prevent any tendency of the forming and cut-off tools to chatter and also to make the same accessible; (4) to provide adequate accessibility and chip clearance at the nose of the spindles; (5) to have all the tool actuating cams readily replaceable by cams of different cam contour so as to shorten the time and effort required for radically diverse set-ups; (6) to provide grooved cams to eliminate the need of return cam rollers; (7) to have separate tools for countersinking and drilling so that each may be used most advantageously to its particular maximum capacity; (8) to use one set of the regular cutting tools as stops for limiting the forward movement of the lengths of bar stock and to cause said cutting tools to move the bar stock rearwardly prior to chucking; (9) to have all spindles turn in the same direction to facilitate set-ups and provide greater tool room standardization; (10) to provide for the independent feed-out of each individual pusher tube and to permit any one or more of the same to be independently rendered inoperative and yet to permit of simultaneously adjusting the feed-out of all the pusher tubes by a single operation; (11) to automatically signal the operator when new lengths of bar stock are to be inserted into the pusher tubes; (12) to reduce to a minimum the projection of the cutting tools beyond the tool holders in which they are clamped so as to ensure greater rigidity and also reduce the amount of metal broken off when said tools become fractured; and (13) to permit of controlling the machine from either side thereof. Numerous other objects of the invention and practical solutions thereof, too numerous to be all specifically mentioned, are shown in detail in the herein patent specification, wherein:

In the accompanying drawings:

Figure 1 is a diminutive side elevation of the screw machine with a portion of the base broken away and with certain parts in section. Figure 22 is a fragmentary, enlarged, horizontal section through the bar stock replenishing signal mechanism taken on line 22—22, Fig. 1. Figure 23 is a fragmentary, enlarged, vertical, transverse section thereof taken on line 23—23, Fig. 22. Figure 24 is a diminutive, fragmentary, side elevation of the speed-change gears taken on line 24—24, Fig. 4.

In the following description, similar characters of reference indicate like parts in the several figures of the drawings.

My invention may be embodied in various forms and in screw machines of different constructions, and the present application is therefore to be regarded merely as one organization which satisfactorily carries out the invention in practice. As here shown, the same is constructed as follows:

General operation

Figures 8, 9, 10, 11, 12, 13, 14:
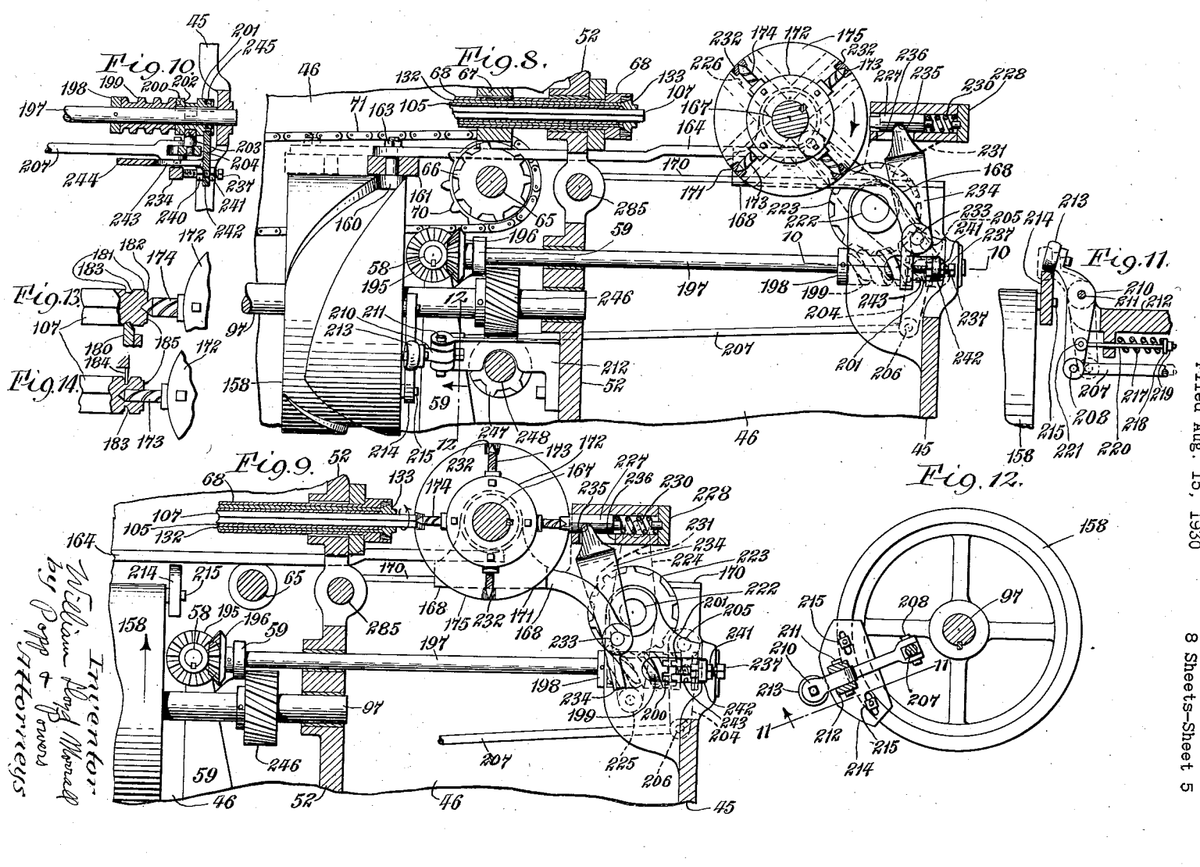
Figures 8 and 9 are vertical, longitudinal, fragmentary medial sections through the screw machine showing the Geneva carriage in different operating positions from that shown in Fig. 5.
Figure 10 is a horizontal section through the Geneva carriage actuating mechanism and taken on line 10—10, Fig. 8.
Figure 11 is a fragmentary, inclined, longitudinal section through the Geneva clutch actuating mechanism and taken on line 11—11, Fig. 12.
Figure 12 is a vertical, transverse section showing the same Geneva clutch actuating mechanism and taken on line 12—12, Fig. 8.
Figures 13 and 14 are enlarged, fragmentary, vertical sections through the front ends of a length of bar stock showing the successive machining operations thereon.

In its general organization as used for making unthreaded nuts (Fig. 7), this improved automatic multiple hollow spindle lathe or screw machine in the form and "set-up" illustrated in the drawings, consists of a horizontal row of six hollow spindles which rotate in fixed centers and receive lengths of metal rods or bar stock through their hollow interiors from their rear ends, the projecting front ends of said bar stock being subjected to a succession of machining operations. The first step in the cycle of operations is to feed the lengths of bar stock forwardly against the noses or ends of countersinks which act as stops. Said countersinks then move rearwardly a definite distance, whereupon the several chucks or collets of the several spindles are contracted to grip the lengths of bar stock and to prevent further longitudinal movement thereof. The countersinks then move further rearwardly to cut a definite distance into the ends of their companion lengths of bar stock, as shown in Fig. 13. In the meantime a forming tool has been moving vertically upward toward each companion bar stock to form the curved and rabbeted end faces, respectively, of the nut being produced. When these countersinking and forming tools have completed their operation they are withdrawn and a Geneva wheel then makes a quarter turn and the ends of the lengths of bar stock are drilled as per Fig. 14. Plain cut-off tools then descend and cut off the machined ends of the bar stock, which ends constitute the unthreaded nuts produced by the machine.

Frame

The bed or base 40 of the machine is of a rectangular, box-shaped construction and has formed at its upper part a sump or drainage floor 41 (see Fig. 5) which extends horizontally over and covers the entire base of the machine and is of liquid tight construction to enable the same to catch and collect the tool-cooling or "cutting" oil which is necessarily used in the machining operations on a high speed lathe of this character. To ensure that all of this cutting oil will be properly caught from all parts of the latter, this drainage floor 41 is extended horizontally outward some distance beyond the top of said base 40 to form gutters or extension troughs 42 which extend around the entire lathe and are provided with suitable upturned flanges 43 at their outer ends to positively confine said cutting oil.

Formed preferably integrally with and extending upwardly from said base 40 is a rigid frame work comprising rear and front end walls 44 and 45 and side walls 46 and 47, the latter walls being connected (integrally or otherwise) at their upper ends by a horizontal top plate 48. Said frame is also provided intermediately of its length with a pair of vertical transverse partitions 51 and 52, the ends thereof being integrally or otherwise connected with aforesaid vertical side walls 46 and 47.

Spindle drive

The source of power may be of any suitable type, the preferred construction comprising an electric motor 53 (see Figs. 1-4) which is mounted above and at one side of the main frame of the machine on a bracket 54. The outboard end of said motor is provided with a driving sprocket 55 which drives an endless primary driving chain 56, the lower turn of which passes around a driven sprocket 57 (see Fig. 24) secured upon a constant speed shaft 58. Said shaft is journaled in the side wall 46 of the main frame and in a standard 59 which rises from the floor 41 of the machine frame. The outer end of said shaft is additionally supported at its upper end upon a supporting arm 60, the lower end of which is securely but detachably connected to a post 61 which is secured to and extends horizontally out from the vertical side wall 46 of the machine frame.

A "cutting oil" gear pump or other suitable liquid pump 62 is located on the machine frame just below said supporting arm 60 and is secured to the upper flat face of a standard 63 which projects upwardly from the adjacent portion of the extension trough 42. This pump is adapted to pump the "cutting oil' from the drainage sump or floor 41 through a suction pipe 64 and to discharge said oil through a discharge pipe 65 whence it is conveyed, in the usual and well known manner, to the various cutting tools. This pump 62 is driven by suitable sprockets and a pump chain 66 from the shaft 58.

Figure 20:
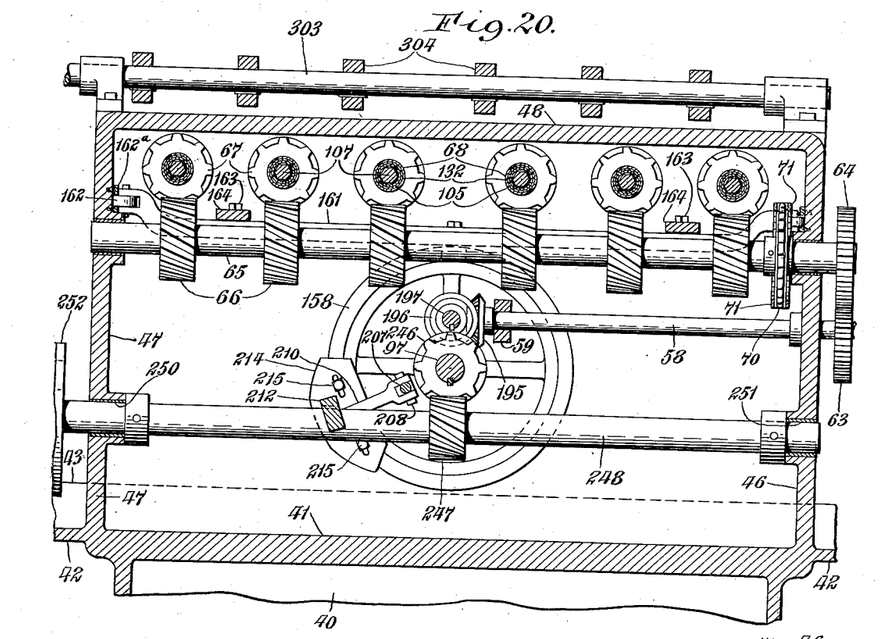
Figures 20 and 21 are fragmentary, vertical, transverse sections through the screw machine taken on correspondingly numbered lines of Figs. 1 and 5.

Secured to said shaft 58 (see Figs. 20, 24, 3, 4 and 1) is a driving spur gear or driving, spindle-speed-change gear 63 which meshes with a driven spur gear or driven, spindle-speed-change gear 64 which is mounted upon and secured to the outer end of a horizontal, transverse spindle drive shaft 65. The latter (see Fig. 20) is suitably journaled in the vertical side walls 46 and 47 of the machine frame and has secured thereto, intermediately of said side walls, a plurality of spiral gears 66. The several spiral gears mesh with and thereby drive companion spiral gears 67 which are keyed or otherwise secured to companion, horizontal, longitudinal, parallel spindles 68 (see Fig. 5). The front ends of said spindles are suitably journaled in the vertical, transverse partition 52 of the machine frame while the rear ends of said spindles are suitably journaled in the vertical, transverse partition 51 of the frame.

The speed of these spindles may be suitably altered to obtain any particular cutting speed which may be desired for different sizes of work and kinds of material by removing the spindle-speed-change gears 63 and 64 and replacing them by suitable change-speed gears of different pitch diameter ratio. Inasmuch, however, as the center-to-center distance between the shafts 58 and 65 is fixed, every set of gears 63, 64 must, of course, be such that the sum of the radii of their rolling circles is equal to this center-to-center distance. The stiffening arm 60 aforementioned is unclamped and then slid out on its supporting stud 61 and then the gears removed and replaced by gears of the desired new pitch diameter ratio. The stiffening arm 60 is then reclamped to properly support the outboard end of the constant speed shaft 58.

*Drive of the barrel cams*

Figure 21:
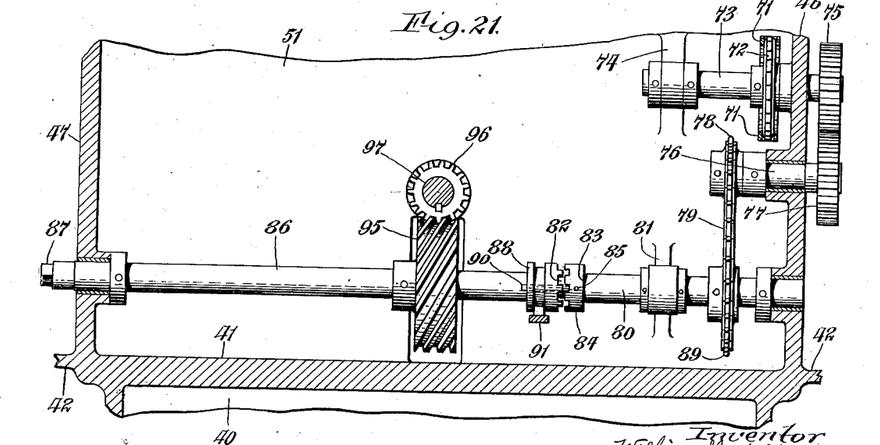

Secured to the horizontal, transverse worm shaft 65 (see Figs. 5 and 20) is a barrel-cam, driving sprocket 70 around which passes a drum-driving chain 71, the stretches of which extend horizontally and longitudinally of the machine. The rear end of said chain passes around a driven sprocket 72 which is secured to a horizontal, transverse jack shaft 73 (see Figs. 21, 5 and 1). The inner end of said jack shaft is suitably journaled in a bracket 74 which is formed integrally with and projects horizontally, longitudinally and forwardly from the vertical transverse partition 51 of the machine frame. The outer end of said jack shaft is journaled in the vertical longitudinal side wall 46 of the machine frame and extends outwardly beyond said side wall and carries at its outboard end a barrel-cam, driving, spur gear or primary feed-change gear 75. Directly below and parallel with said jack shaft 73 is located an intermediate shaft 76 which is suitably journaled in the vertical side wall 46 of the machine frame. This intermediate shaft carries a secondary feed-change gear 77 which meshes with and is driven by the aforesaid primary feed-change gear 75. The inner end of said intermediate shaft 76 carries a sprocket 78 around which passes an endless chain 79 the lower end of which passes around a sprocket 89 which is secured to and drives a horizontal, transverse clutch shaft 80 which is suitably journaled in the frame of the machine in a bracket 81 and in the longitudinal side wall 46 of the machine frame.

As will appear more clearly hereinafter, it is desirable (for different kinds of work and for different kinds of bar stock material) to change the rotative speed of the barrel cams so as to obtain maximum production of the particular sort of parts being produced on the machine. For this reason the two feed-change gears 75 and 77 are adapted to be removed and replaced by others having a different pitch diameter ratio.

The inner end of aforesaid clutch shaft 80 is formed to provide a coaxial reduced end or stud 82 and, concomitantly to provide a transverse annular shoulder 83 at the outer terminus of said reduced end. Mounted upon said stud 82 and bearing against said shoulder 83 is a driving dog-clutch collar 84 which is secured to the clutch shaft 80 by a pin 85 or otherwise. Axially in line with said clutch shaft 80 is a manually operable shaft 86, the inner end of which is bored to receive the aforesaid reduced end or stud 82 of said clutch shaft 80, while its outer end is suitably journaled in the longitudinal side wall 47 of the machine frame. The outboard end of this manually operable shaft 86 is milled to form a squared end 87 which is adapted to be received within the socketed hub of a suitable hand crank wheel or other turning device whereby this shaft may be operated manually when testing a new "set up" on the machine, as will hereinafter be more clearly understood. The inner end of this manually operable shaft 86 is provided with a driven dog-clutch collar 88 which slides upon said shaft 86 and is restrained against rotation relatively thereto by a suitable feather key 90 but is rendered capable of being moved longitudinally into and out of engagement with the aforesaid driving, dog-clutch collar 84 by a fork 91 formed at the rear end of a double-armed bell crank 92 (see Figs. 2, 4 and 1). Said bell crank is pivoted to the frame of the machine at 93 and its two outwardly and forwardly projecting arms are pivoted to companion clutch operating levers 94 and 94a which are disposed transversely of the machine and extend outwardly through the opposite side walls 46 and 47 thereof so as to enable the operator, whether positioned on the one or other side of the machine, to conveniently engage or disengage the dog clutch collar 88. This is an important advantage of the present machine in that it considerably reduces the time required for any given "set up" by eliminating the need for running around the machine to engage or disengage said clutch.

Pinned or otherwise secured to the manually operable horizontal transverse shaft 86 is a steep pitched driving spiral gear 95 (see Figs. 21 and 5) which meshes with a driven spiral gear 96, the latter being keyed to a horizontal, longitudinal barrel cam shaft 97. This shaft is journaled at three points in the frame of the machine,—namely in the rear end wall 44; in the central, vertical, transverse partition 51; and in the forward transverse partition 52. Secured to said longitudinal barrel cam shaft 97 is a collet-operating drum or barrel cam 98.

*Bar stock feed-outs*

Formed integrally or otherwise with the main frame of the machine and extending horizontally and transversely thereof (see Figs. 19, 4, 5 and 29) is a slide-supporting bar or beam 101 upon the upper face of which are secured, by cap screws 102 or otherwise, a plurality of horizontal, longitudinal carriage ways or slides 103 of square-cut "dovetail" construction. On each of said slides is slidably mounted a feed-out carriage 104 which receives and is a sliding fit upon the rear end of a companion feed-out sleeve or pusher tube 105 which is concentrically disposed within the bore of its companion tubular spindle 68. The front end of each of said pusher tubes 105 (see Fig. 6) is provided with the usual resilient, pushing tongues 106 which are formed in such manner that, when the companion pusher tube is moved forwardly, the companion pushing tongues 106 resiliently grip the hexagonal or other raw-material rods or bar stock 107 and move the latter bodily forward until a sufficient length of the same projects out beyond the front end of the companion spindle 68. The forward movement of each of said feed-out carriages 104 is effected independently of all of the other carriages by means of a weight 109 which is fastened to a flexible cord 110, (see particularly Figs. 29 and 2) the upper end of which passes around a pulley 111 which is supported upon the machine frame on a bracket 112. The upper end of each of said flexible cords 112 extends rearward (horizontally and longitudinally) from its companion pulley 111 and is suitably secured at its rear end to a lug 113 formed on the companion feed-out carriage 104. By this construction each piece of bar stock 107 is independently pushed forward by its individual weight 109 acting through its companion feed-out carriage 104 and pusher tube 105.

Any individual one of said feed-out carriages 104 may, however, be prevented from moving forwardly under the influence of its individual weight 108. This is accomplished by making the connection between each of said feed-out carriages 104 detachable from the rear end of its companion pusher tube 105, the organization of the parts being as follows: Firmly secured upon the rear end of each pusher tube 105 is a "pusher" or shift collar 114 which is a loose running fit within the horizontal longitudinal bore of its companion feed-out carriage 104. When the whole machine is in normal operation, each feed-out carriage is constrained to move longitudinally with said shift collar 114 by reason of a locking gate 115 which (see particularly Figs. 19 and 5) extends horizontally and transversely of its companion feed-out carriage 104 and is detachably pinned thereto by pins 116 at its opposite ends. Each locking gate 115 is restrained against longitudinal movement relatively to its companion feed-out carriage 104 by being located snugly within a transverse guide slot 117 which is cut horizontally and transversely through the upper part of said companion feed-out carriage 104. The central lower part of each gate 115 normally extends some distance into the bore of its companion feed-out carriage and is adapted to normally be snugly received between the horizontal transverse walls of a locking slot 118 which is cut into the upper face of the shift collar 114. Thus, in normal operation, with the gate 115 in its lowered position, its companion pusher tube 105 is constrained to move forwardly and backwardly with its companion feed-out carriage 104. If, however, it is desired to stop the operation of any one of said pusher tubes 105, its companion locking gate 115 is raised by first removing one of its pins 116 and then throwing said gate up and back as shown by dotted lines in Fig. 19. Then when the operation of this idle pusher tube is to be resumed, the reverse process is employed, the locking gate being swung down into the full line position of Fig. 19 and locked in place by its appropriate companion pin 116.

*Retraction of the bar stock feed-outs*

Longitudinally and horizontally slidable in the machine frame is a retraction carriage 120 (see Figs. 2, 1, 4, 5 and 19) supported at opposite ends by supporting rollers 121 which ride in horizontal, longitudinal runways 122 formed in the side walls 46 and 47 of the machine frame. Said carriage is prevented from cocking or being thrown out of parallelism by being provided at its outer corners with horizontal rearwardly projecting legs 123 which carry guide rollers 124, the latter running in horizontal, longitudinal guide grooves or tracks 119 which are suitably formed in the inner vertical faces of the side walls 46 and 47 of the machine frame. This retraction carriage 120 straddles all of the pusher tubes 105 and at all times bears with its rear vertical face against the front vertical faces of all of the feed-out carriages 104.

The forward movement of this retraction carriage 120 is effected under the influence of all of the weights 108 which constantly tend to move their companion feed-out carriages forwardly. The rearward movement, however, of said retraction carriage is effected positively and in the following manner (see Figs. 5 and 4). Extending below the central portion of said retraction carriage is a thrust leg 125 upon the lower end of which is arranged an anti-friction, thrust roller 126, the axis thereof being vertical. Adjustably connected to the rear face of the hereinbefore-described collet-operating barrel cam 98 is a semi-cylindrical retraction cam 127. As the barrel-cam shaft 97 is rotated, this retraction cam 127 comes into contact with the thrust roller 126 of the retraction carriage 120 and forces the same rearwardly and thus also forces rearwardly all of the individual feed-out carriages 104 and their companion pusher tubes 105. When said thrust roller 126 rides over the crest of said retraction cam 127, it allows the retraction carriage 120 to move forwardly under the influence of the several weights 108, together with the feed-out carriages 104 and pusher tubes 105. During this forward movement of said pusher tubes the resilient pushing tongues 106 thereof, being in frictional engagement with the several pieces of bar stock 107, push the latter forwardly. The amount of bar stock to be pushed forwardly or "fed out" depends on the dimensions of the work being produced and is rendered adjustable by the provision of a pair of adjusting bolts 128 which are adapted to clamp the retraction cam 127 to the collet-operating barrel cam 98 in any desired longitudinal position relatively thereto. Inasmuch as said barrel cam 98 is rigidly secured to the shaft 97 and the latter is restrained against longitudinal shifting by the provision of suitable thrust collars 130 and 131 which are pinned thereto, it follows that this longitudinal adjustment of the retraction cam 127 is an absolute longitudinal adjustment relatively to the frame of the machine and operates to alter the "stroke" of the retraction carriage 120 and pusher tubes 105, etc., and thereby also the "feed out" of the pieces of bar stock 107.

*Collets*

Each hollow spindle 68 has disposed within its bore and rotates with a draw chuck or collet 132 of the usual and well known type (see Figs. 6 and 5), the front end thereof being provided with a suitable conical split head 133 so that when the collet is forcibly moved backward, its conical split head 133 is wedged into a conical seat 134 which contracts the split head and causes the latter to firmly grip the piece of bar stock 107. The rear end of said collet 132 has suitably secured thereto a thrust ring or collar 135 which is adapted to be forcibly moved rearward by the noses of a number of clutch fingers 136. The latter are suitably pivoted at 137 to a clutch sleeve 138 which is secured to the periphery of its companion spindle 68 and rotates therewith. Said clutch fingers are preferably provided with anti-friction rollers 140 at their front extremities, said rollers being adapted to roll up and over the conical nose of a clutch cone 141, and to thereby force apart the front ends of said clutch fingers 136 and to push back the thrust collar 135 and hence also the collet 132 relatively to the spindle 68 and to thereby cause the conical split head 133 to firmly grip the piece of bar stock disposed therein. The retraction of each collet 132 is effected by a plurality of horizontal, longitudinal compression springs 142 seated at their rear ends in the bottom of pockets 143 in the clutch sleeve 138 and bearing at their front ends against the disk shaped heads of companion draw plungers 144 which are secured at their rear ends to the thrust collar 135.

Each of said clutch cones 141 is provided with a square faced annular groove 145 which receives a companion clutch shifting fork 146. Each fork is arranged upon and is capable of vertical movement relatively to a clutch carriage 147 (see Figs. 18, 2, 1 and 5). Normally each fork is restrained against vertical movement by a retaining pin 148 (Fig. 5) which is horizontal and longitudinal and passes rearwardly into the front face of said clutch carriage 147, through its companion fork 146 and continues into the intermediate portion of said clutch carriage 147. When it is desired to render any particular one or more of the clutch cones 141 inoperative, this is accomplished by pulling out the corresponding retaining pins 148 whereupon the companion forks will drop entirely out of the annular grooves 145 (see fork No. 1 in Fig. 18). Each fork is prevented from falling clear through the clutch carriage 147 by the provision of a pair of suitable stop shoulders 150 at their upper ends.

Normally all of the forks 146 move with and are longitudinally shifted by the clutch carriage 147 to which they are secured normally in their elevated or operative position by their companion retaining pins 148. This clutch carriage 147 is quite similar to the feed-out carriage 104 previously described, being disposed horizontally and transversely of the machine and supported at opposite ends on supporting rollers 151 which ride in horizontal, longitudinal runways 152 formed in the side walls 46 and 47 of the machine frame. Extending forwardly and horizontally from the outer ends of said clutch carriage 147 are legs 153 in the outer ends of which are journaled guide rollers 154 which run in horizontal, longitudinal guide grooves or tracks 155. This construction prevents the clutch carriage from cocking or being thrown out of parallelism.

Projecting downwardly from the central part of said clutch carriage 147 is a thrust leg 156 (see Figs. 18, 5 and 29) carrying at its lower end a thrust roller 157 journaled on a vertical axis. This thrust roller is engaged by the sinuous cam face of the aforedescribed collet-operating barrel cam 98.

*Geneva carriage*

Secured to the aforementioned barrel-cam shaft 97 is a Geneva-carriage barrel cam 158 provided with a sinuous cam groove in which rides an anti-friction roller 160 which is vertically journaled on the lower face of an equalizing carriage 161 and causes the same to be moved longitudinally in synchronism with the rest of the machine. This equalizing carriage is constructed substantially similar to the retractive carriage 120 and clutch carriage 147, being disposed horizontally and transversely of the machine between the vertical side walls 46 and 47. Each end of said equalizing carriage 161 is provided with horizontal, longitudinally projecting legs in whose outer ends are journaled guide rollers 162 which ride in suitable grooves or tracks 162a formed suitably on the inner vertical faces of the machine frame side walls 46 and 47. The disposition of these rollers permits said equalizing carriage to freely move longitudinally in perfect parallelism.

Pivoted at 163—163 (see particularly Figs. 2 and 5) upon said equalizing carriage adjacent opposite ends thereof are a pair of parallel, horizontal, longitudinal links 164, the front ends of which are pivoted at 165 to a pair of journals or collars 166. Rotatably disposed within said collars is a horizontal, transverse Geneva shaft 167 which is suitably journaled in the upper ends of four supporting shoes 168, the lower longitudinal faces of which are suitably formed to slide upon the four V ribs or carriage ways 170 suitably arranged on the frame of the machine. Said Geneva shaft 167 with its four supporting shoes 168 constitutes what will be termed a Geneva carriage 171.

Mounted upon and firmly secured to said Geneva shaft 167 and in axial alignment with the spindles 68 are a plurality of end operation or tool turrets 172 each of which carries a pair of drills 173 and a pair of countersinks 174 or other cutting tools which move parallel to the axis of the bar stock 107. All of these tool turrets 172 are simultaneously indexed by a Geneva wheel 175, one countersink and one drill of each tool turret being presented to the end of the bar stock 107 for each "chucking" cycle. In other words there are two complete sets of cutting tools on each tool turret. This requires that the Geneva shaft 167 need be only turned a quarter revolution for each successive cutting operation and this considerably increases the rate of production of the machine and also reduces the jar of stoppage of the Geneva wheel 175. In addition to this the doubling of the number of tools used cuts in half the number of times the machine need be stopped for re-sharpening or replacing of the tool turret cutting tools 173 and 174.

*Sequence of operation*

The product of this machine, with the particular set up illustrated in the drawings, consists of a hexagonal nut 176 (see Figs. 7, 6, 13, 14 and 1). The first operation in the production cycle of the machine for the set up is the rearward movement of all the pusher tubes 105 effected by the actuation of the retraction carriage 120 by the retraction cam 127. This does not affect the position of the pieces of bar stock 107 inasmuch as the latter are being gripped by the hollow spindle chucks or collets 132. These several collets are now moved forwardly and thereby released by their companion compression springs 142 which are able to affect this forward movement of said collets as soon as their cmpanion clutch cones 141 have been moved forwardly by their clutch carriage 147 under the influence of the collet-operating barrel cam 98. Thereupon the pusher tubes 105 are moved forwardly, the frictional engagement of their pusher tongues 106 causing the bar stock 107 in each of said pusher tubes to be moved longitudinally therewith. The horizontal forward movement of each of the pusher tubes is effected independently by its companion weight 108 which pulls forward its companion feed out carriage 104, the latter being normally connected by means of its companion locking gate 115 with the companion shift collar 114 of its companion pusher tube 105. Too rapid a forward speed of the pusher tubes is prevented by the retraction carriage 120, the thrust roller 126 moving forwardly down the reverse slope of the retraction cam 127. This forward movement of pusher tubes 105 and bar stock 107 continues until the front end of each length of bar stock comes more or less violently into contact with the nose of its companion countersink 174.

The entire Geneva carriage 171 with said countersinks now moves rearwardly which causes all of said countersinks 174 to push the lengths of bar stock 107 also rearwardly. This arrangement eliminates any possibility of longitudinal chucking inaccuracies which might occur if the lengths of bar stock 107 were to bounce back from the noses of said countersinks 174 and be clamped by the collets while the noses of said countersinks were momentarily not in contact with the ends of their respective bar stock 107. After the Geneva carriage 171 has moved back a sufficient distance, the collets 132 are moved backwardly by the backward movement of the clutch carriage 147 and clutch cones 141, this action causing the pieces of bar stock 107 to be firmly chucked or gripped in their companion collets 132.

The Geneva carriage 171 then continues rearwardly causing the countersinks 174 to drill axially into the end of the bar stock (see Fig. 13) until the resulting countersunk, conical holes have a maximum diameter which is greater than the outside diameter of the internal threads which are ultimately to be cut in the nuts being produced. This ultimately provides substantially the effect of a tapered internal thread and considerably facilitates the subsequent screwing of the nuts upon the external threads of a bolt, stud or other threaded member with which the nuts are to be associated. Simultaneously with this countersinking operation, the circular forming tools 180 have been moving vertically upward to cut a shoulder 181, boss 182 on the outermost or almost entirely machined nut 175 and also to partially form a crown 183 on each embryonic nut 176 which is next to be formed from the piece of bar stock 107. By this time these cutting operations have been completed, the anti-friction roller 160 of the equalizing carriage 161 has reached the apex of the sinuous cam groove of the Geneva-carriage, barrel cam 158. Further movement of this barrel cam causes the Geneva carriage to be moved forwardly, thus retracting the countersinks 174.

When said Geneva carriage 171 reaches the forward (retracted) end of its stroke, its Geneva shaft 167 and tool turrets 172 are indexed a quarter turn (in a manner to be subsequently described) and the entire Geneva carriage again moved rearwardly causing the drills 173 to axially drill entirely through the embryonic nuts 176 in the manner shown in Fig. 14. When this drilling operation has been completed, said Geneva carriage 171 is again reversed and moved forwardly of the machine, thereby retracting all of said drills 173. In the meantime the cutting-off tools 184 have been moving down to complete the crown 183 of said nuts 176 and also to form the bottom face 185 of said nuts. These cutting-off tools 184 do not however complete their cutting operation until the Geneva carriage 171 and its drills 173 have completed their work and have been partially moved forward so as to avoid any interference between the several drills 173 and their companion cutting-off tools 184. The completed product of the machine (the non-threaded hexagonal nuts 176) now drop off by gravity from their erstwhile companion lengths of bar stock 107 and fall upon an inclined drain table 186 which removably rests upon suitable shoulders 187 and 188 formed on the vertical faces of the transverse partition 52 and the front end wall 45 respectively of the machine frame. This drain table 186 is provided with numerous drain holes 189 through which excess cutting oil passes through and down upon the cutting-oil drainage floor or sump 41. The nuts are caught on the inclined upper face of said drain table 186 and, because of the slope thereof, are caused to automatically slide out into a suitable receptacle whenever the doors 190 at the lower end of said drain table 186 are opened.

Rotation of Geneva wheel

Figure 5:
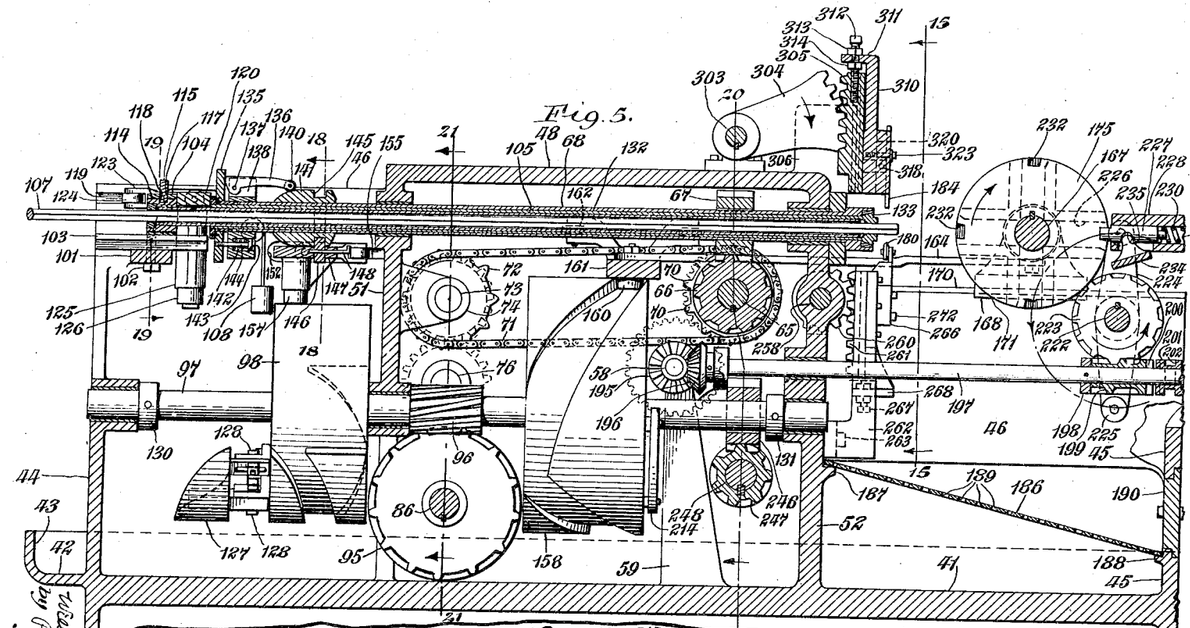
Figure 5 is a fragmentary, vertical, longitudinal, medial section through the screw machine taken on line 5—5, Fig. 2.
Figure 25:
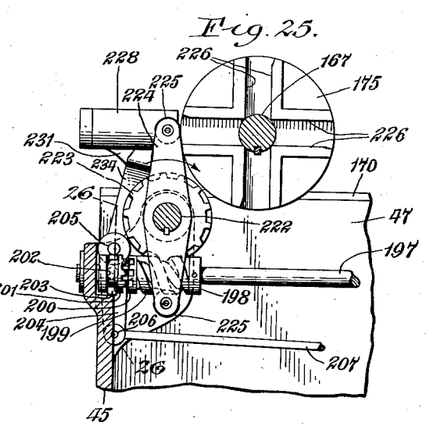
Figure 25 is a fragmentary, vertical, longitudinal section through the Geneva wheel actuating mechanism taken on line 25—25, Fig. 2.
Figure 26:
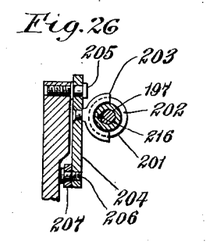
Figure 26 is a fragmentary, vertical, transverse section through the Geneva actuating clutch taken on line 26—26, Fig. 25.

Secured to the inner end of the aforedescribed constant speed shaft 58 (see Fig. 20) is a driving bevel gear 195 which meshes with and drives a driven bevel gear 196 (see Figs. 5 and 8). The latter is secured to the rear end of a horizontal and longitudinal, secondary, Geneva-turning shaft 197 which is also suitably journaled in the machine frame (see also Fig. 25) and has pinned thereto, near its front end, a thrust collar 198. Journaled upon said shaft 197 in front of said thrust collar 198 is a worm gear 199 which has formed, upon its front or outer end face, an annular, coaxial row of dog clutch teeth 200. The latter are adapted to be engaged by the teeth of a slidable dog clutch 201. Formed in the periphery of said dog clutch is a square faced annular groove 202 which (see Fig. 26) receives the two legs of a shifting yoke 203 which is connected with a vertical, clutch-shifting lever 204. The upper end of said lever is pivotally connected to the frame of the machine upon a horizontal, transverse pivot 205. The lower or outer extremity of said lever 204 is pivoted at 206 to the rear end of a clutch shifting link 207 which extends approximately horizontally and longitudinally of the machine and is pivoted at its forward end at 208 to the lower end of a bell crank lever 210 (see Figs. 11, 12, 8 and 2).

This bell crank lever 210 lies in a longitudinal plane which passes through the axis of the barrel-cam shaft 97 and is centrally pivoted (perpendicularly to said plane) at 211 upon a suitable bracket 212 which is secured to the rear face of the partition wall 52 of the machine frame. Upon the inner or upper end of said bell crank lever 210 is journaled an anti-friction roller 213 which rides upon a cam segment 214 adjustably secured by adjustment bolts 215 to the front face of the Geneva-carriage barrel cam 158. Thus, as said barrel cam rotates, the cam segment 214 synchronously forces the roller 213 outwardly and thereby actuates the bell crank lever 210 and causes the dog clutch 201 to move longitudinally, so that its teeth come into engagement with the dog clutch teeth 200 of the worm gear 199. As said dog clutch 201 is keyed by a feather key 216 to the secondary, Geneva-turning shaft 197 which is always rotating at a constant speed, it follows that the movement of this dog clutch 201 rearwardly of the machine causes the worm gear 199 to be rotated. Retraction of said dog clutch is effected by a horizontal, longitudinal compression spring 217 (see Fig. 11) whose rear end bears against the main frame of the machine and whose front end bears against the washer 218 and nut 219 of a horizontal, longitudinal draw bolt 220, the rear end of which is pivoted at 221 to the bell crank 210.

Journaled horizontally and transversely in the machine frame (see Figs. 5, 8, 2, 25 and 1) above the worm gear 199 is a tertiary, Geneva-turning shaft 222 secured to which is a worm wheel 223 which is in constant mesh with the aforesaid worm gear 199 and is driven thereby whenever the dog clutch 201 is in its rearward or engaged position. Also secured to said transverse, tertiary, Geneva-turning shaft 222 is a double-armed, Geneva-turning yoke 224, the opposite arms of which extend laterally out and at equal distances from said shaft 222 and at 180 relatively to each other. In the outer ends of the opposite arms of said yoke 224 are suitably journaled anti-friction rollers 225. As the shaft 222 and yoke 224 are rotated, these rollers successively enter into four square-faced runways 226 which are formed radially in the vertical, longitudinal, end face of the Geneva wheel 175 and are disposed at 90° relatively to each other. As said shaft 222 rotates, the uppermost of the rollers 225 enters into the nearest of the runways 226 and continues to further enter and to turn the Geneva wheel 175 until the latter has been rotated 45° (see dotted lines, Fig. 8), whereupon the said roller commences to retract gradually from said runway but continues to turn the Geneva wheel 175 until the latter has been rotated another 45° thereby completing a 90° rotation of said Geneva wheel. Said roller 225 then moves downwardly and disengages itself completely and entirely from its particular erstwhile runway 226 and from the Geneva wheel 175 in general. The yoke 224 with its rollers 225, however, continues to turn until it has passed through 180° to the position of Figs. 25, 5, 1 and 2 in which position it is ready to renew its cycle of operations and again turn 180° to rotate the Geneva wheel 90°. In other words, for every half revolution of the yoke 224, the Geneva wheel 175 is rotated one quarter of a revolution.

Indexing of Geneva wheel

The foregoing successive 90°, partial rotations of the Geneva wheel 175 do not, per se, sufficiently accurately locate or index the Geneva wheel and its index heads 172 to permit of a satisfactory and uniform accurate product. The necessary precise positioning or indexing of these parts is accomplished by an index pin 227 which is horizontally and longitudinally slidable within the bore of a guide head 228 (see Figs. 5, 8, 9, 2 and 1) and is resiliently pressed rearwardly by a suitable compression spring 230 disposed within said guide head 228. The latter is suitably secured to a bracket 231 connected with one of the supporting shoes 168 of the Geneva carriage 171 (see Figs. 2 and 3) and is thereby caused to move longitudinally therewith. The lower face of the nose or front end of said index pin 227 is slightly beveled to facilitate its entrance into any one of four index holes 232 which extend radially into the Geneva wheel 175 from the periphery thereof and are formed at 90° relatively to each other so as to index said Geneva wheel in four 90° positions corresponding to the four tool holders of each of the index heads 172.

Pivoted at 233 (see Figs. 8, 9, 2, 3, 5 and 1) upon one of the supporting shoes 168 of the Geneva carriage 171 is a disengaging lever 234 the upper end of which is rounded and is received within a socket 235 formed in the lower face of the index pin 227. The lower part of the guide head 228 (in which said index pin slides) is suitably cut-away at 236 to permit the entrance of the upper end of said disengaging lever 234. The lower end of said disengaging lever extends below the pivot 233 thereof and comes in contact with and is arranged to be pushed forwardly by the nose of an adjustable disengaging screw 237 whenever the dog clutch 201 is moved rearwardly into engagement with the dog clutch teeth 200 of the worm gear 199 (see particularly Fig. 10). This is accomplished by mounting said disengaging screw 237 together with its two lock nuts 240 and 241 upon a slide arm 242, the outer end of which is longitudinally guided in a slide 243 formed in a bracket 244 connected with the machine frame. The inner end of said slide arm 242 is bored to be rotatably received within a square faced annular groove 245 formed in the front end of the dog clutch 201. Thus, as said dog clutch is moved rearwardly (through its various connections from the cam segment 214) and thus into engagement with the dog clutch teeth 200 of the worm gear 199, this slide arm 242 is also moved rearwardly therewith, causing its disengaging screw 237 to push the lower end of the disengaging lever 234 rearwardly and to thereby move the upper end of said lever forwardly and thereby to disengage the index pin 227. This is necessary because the Geneva wheel 175 cannot be turned until its index pin 227 has been disengaged and the intimate correlation between the dog clutch 201 (which operates said Geneva wheel 175) and said index pin 227 (which locks said Geneva wheel) ensures that no mishap can occur.

Forming tools

Secured to the barrel-cam shaft 97 near its front end (see Fig. 5) is a driving spiral gear 246 which meshes with and drives a driven spiral gear 247 which (see Fig. 20) is keyed to a horizontal, transverse shaft 248 journaled at 250 and 251 in the side walls 47 and 46 of the machine frame. Secured to the outboard end of said shaft 248 is a positive-action forming-tool cam 252 (see Figs. 28, 2, 3, 4, 1 and 20) which is provided with a square faced cam track 249 upon its inner vertical face. Arranged to roll around in said cam track and be definitely controlled thereby is a cam roller 253 which is suitably journaled at the lower end of a rack bar 254. The latter slides up and down within a guideway 259 which is secured by bolts 255 to the outer face of the vertical side wall 47 of the machine frame. The upper, front face of said rack bar 254 is provided with rack teeth 256 which mesh with a main, forming-tool spur gear 257 which is keyed to a horizontal, transverse shaft 258, the latter being suitably journaled in the upper part of the transverse wall 52 of the machine frame (see Figs. 5, 1, 2, 3, 15 and 16).

Figures 15, 16, 17, 18:
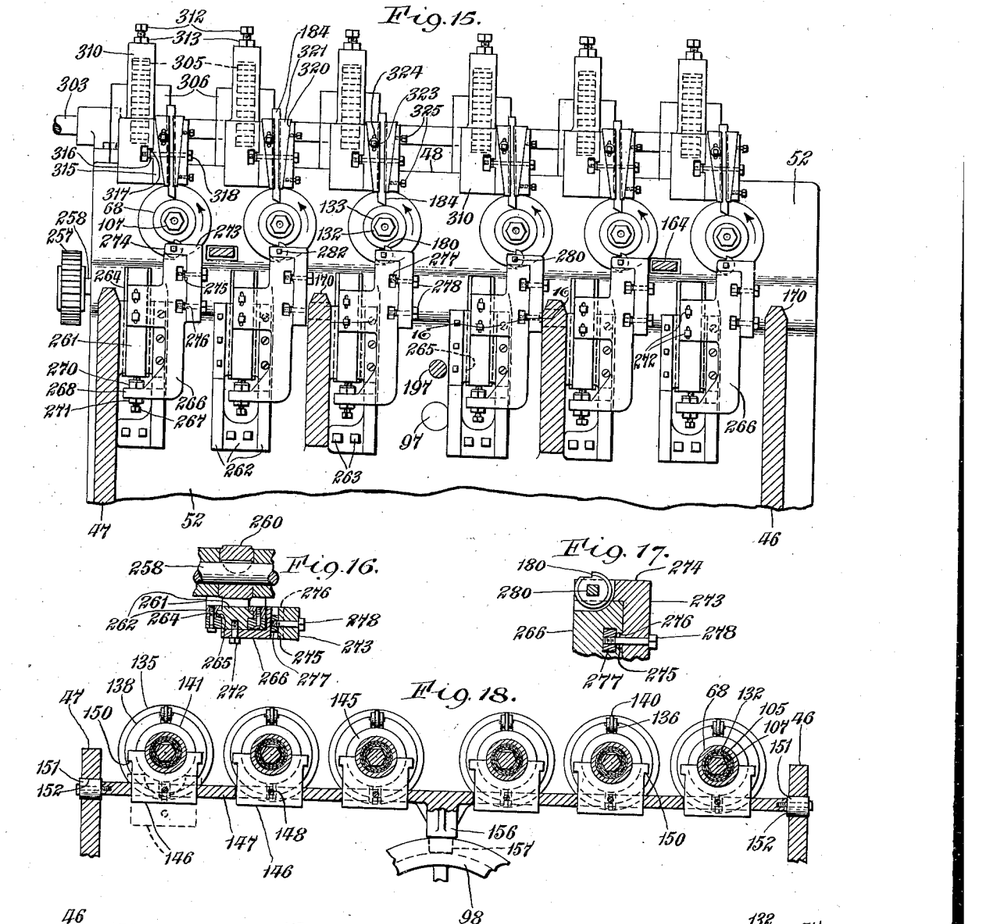
Figure 15 is a fragmentary, vertical, transverse section through the screw machine taken on line 15—15, Figs. 1 and 5.
Figure 16 is a fragmentary, horizontal section through one of the forming tool slides taken on line 16—16, Fig. 15.
Figure 17 is a fragmentary, enlarged, vertical, transverse section through the forming tool holder.
Figures 18 and 19 are fragmentary, vertical, transverse sections through the pusher-tube actuating members and taken on correspondingly numbered lines of Fig. 5.
Figure 19:
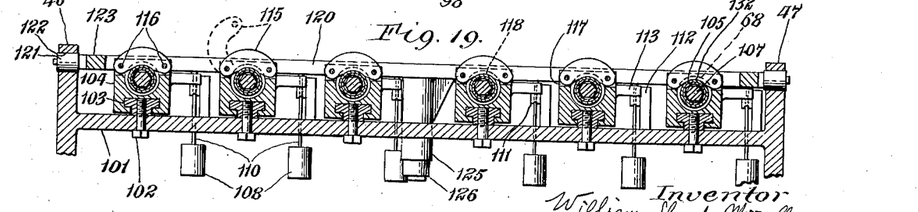

Secured to said shaft 258 are a plurality of semi-spur gears 260 each gear being located below and slightly to one side of its companion spindle 68. Each of said semigears 260 meshes with a companion forming-tool rack 261 which slides vertically in a slide bracket 262 secured by bolts 263 to the front face of the vertical, transverse partition 52 of the machine frame. As best shown in Figs. 16 and 15, each of said forming-tool racks 261 is provided on its lateral faces with square faced guide ribs 264 which are suitably received in the built-up guideway 265 of its companion slide bracket 262. Secured to each rack 261 is a forming-tool adjustment plate 266 which is rendered vertically adjustable relatively to its companion rack 261 by means of a vertical adjustment screw 267 which is permanently screwed up into the lower face of its companion rack 261 and slidably through a horizontal lip 268 which is formed at the lower end of its companion adjustment plate 266. Arranged on said adjustment screw are upper and lower lock nuts 270 and 271 which bear respectively against the upper and lower faces of said lip 268. To adjustably raise or lower any one of the adjustment plates 266, the proper one of its companion lock nuts 270 or 271 is first slackened off and its companion lock nut then correspondingly tightened. The adjustment plate is then further clamped in this position (and is also additionally supported) by a pair of clamp screws 272 which pass through suitable vertical slots in their companion adjustment plate 266 and are threaded into their companion rack 261.

Connected with each of said adjustment plates 266 and horizontally and longitudinally adjustable relatively thereto is a forming-tool holder 273 the upper arm 274 of which (see Figs. 17 and 15) rests at all times solidly upon the upper horizontal face of its companion adjustment plate 266. This tool holder 273 during the time it is being adjusted is prevented from tipping by the provision (on its inner vertical face) of a pair of guide ribs 275 which are slidably received within horizontal, longitudinal guide slots 276 formed in the adjacent longitudinal vertical face of the companion adjustment plate 266. Each slot 276 is rectangularly enlarged at its inner or bottom portion to accommodate a rectangular drawhead 277 into which is screwed a clamping screw 278. The two clamping screws 278 of each tool holder 273 are tightened up after the tool holder itself has been properly positioned longitudinally relatively to its companion adjustment plate 266.

Figures 6, 7:
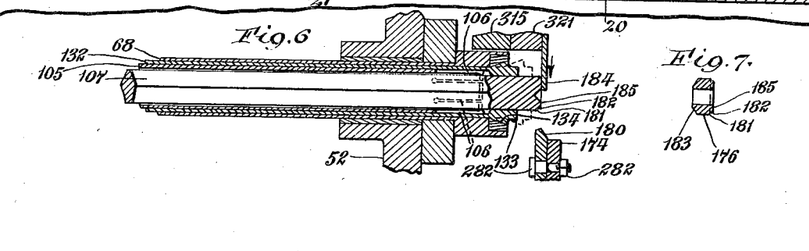
Figure 6 is an enlarged fragmentary, vertical section through the front end of one of the spindles showing the completion of the cutting-off operation.
Figure 7 is an enlarged, vertical, longitudinal section through the unthreaded nut which is the article produced by this improved screw machine with the particular set-up illustrated.

Rotatably mounted upon a clamp bolt 280 in the upper arm 274 of each tool holder 273 is a circular forming tool 180 (see also Figs. 6, 5 and 13). These forming tools are adapted to be ground to form a radial cutting face in the usual and well known manner and to be reground whenever their edges become dulled through use. Each circular forming tool is adapted to be rotated to proper cutting position and to be clamped by a suitable clamp nut 282.

Figures 27, 28, 29:
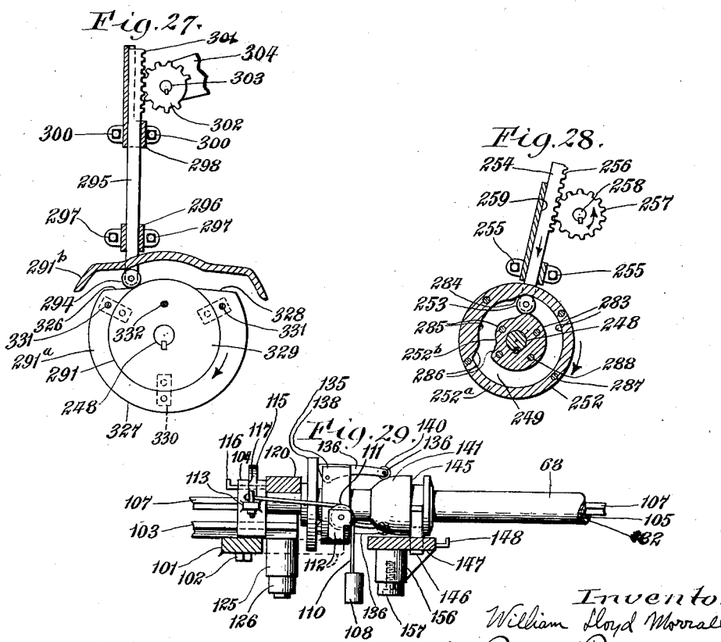
Figure 27 is a fragmentary, vertical, longitudinal section through the cut-off tool actuating mechanism taken on line 27—27, Fig. 2.
Figure 28 is a fragmentary, vertical, longitudinal section through the forming-tool actuating mechanism taken on line 28—28, Fig. 2.
Figure 29 is a fragmentary, vertical, longitudinal section through the rear end of one of the spindles.

These circular forming tools 180 are simultaneously moved vertically upward under the influence of the forming-tool cam 252. In the position of this cam, as shown in Fig. 28, the same is at the end of its idle stroke, the rotation being clockwise and the idle portion 283 of the cam being concentric with the axis of the cam. Further rotation of said cam from the particular position illustrated causes the roller 253 to be very rapidly moved downwardly upon the steep cam advancing slope 284 and consequently all of the circular forming tools 180 to be very rapidly moved upwardly until they are almost in contact with their companion lengths of bar stock 107. Thereupon, the roller 253 starts to gradually and slowly move still further downwardly upon the semi-spiral cutting cam face 285. This causes the forming tools 180 to feed gradually upwardly and to transversely cut into their companion lengths of bar stock 107. As soon as these forming tools have cut the desired distance into the bar stock 107 (the extent of cutting is rendered adjustable by the adjustment plates 266) the roller 253 is moved rapidly upward upon the steep cam retracting slope 286 until all of said forming tools 180 are again considerably below and entirely clear of the lengths of bar stock 107. This provision for having the forming tools 180 drop a considerable distance below the bar stock provides a very generous chip clearance and also enables the completed product (nut 176) to drop off the front ends of said bar stock without the possibility of becoming jammed in between out the bar stock itself and said forming tools 180. At the same time all possible adjustments of the forming tools are individually provided for, i. e., each forming tool may be properly and individually rotated to proper cutting position and each may be moved individually either longitudinally or vertically relatively to its companion rack 261 so as to enable it to perform its cutting operation in exactly the manner desired.

In addition to these adjustments, provision is made for changing the forming-tool cam 252 so as to change the relative sequence of operation and the amount of movement of the circular forming tools 180. This is accomplished by having said cam readily detachable and replaceable by a cam of another form. Said forming-tool cam 252 consists of an outer and an inner cam section 252a and 252b which are preferably integrally connected and are detachably bolted by bolts 287 and 288 to a permanent disk 290 which is permanently secured to the horizontal, transverse shaft 248. Thus, to change the actuation of the forming tools 180, the bolts 287 and 288 and the cam sections 252a and 252b constituting the cam 252 are removed and said cam then replaced by a cam having the desired different contour. The latter is then secured in place by the bolts 287 and 288 aforesaid. Such a replacement of a different forming-tool cam 252 is, of course, only required when making a radical change in the set-up of the machine so as to adapt the same for use in making a product quite radically different from that which was produced by the previous set-up. In other words, the changing of said forming-tool cam 252 is required only infrequently.

Cut-off tools

Secured to the outermost end of the aforedescribed, horizontal, transverse shaft 248 and out beyond the forming-tool cam 252 just described, is a cut-off-tool cam 291 (see Figs. 27, 2, 3, 4 and 1). Riding in the cam groove of said cut-off-tool cam 291 is an anti-friction roller 294 which is suitably journaled at the lower end of a vertically slidable, primary rack 295 which is suitably guided at its lower end in a bracket slide 296 secured by bolts 297 to the adjacent vertical side wall 47 of the machine frame. The upper end of said primary rack 295 is suitably guided in a bracket slide 298 which is secured by bolts 300 and to the side wall 47 of the machine frame. Formed in the upper front vertical face of said primary rack 295 are a plurality of rack teeth 301 which mesh with a main, mutilated or semi-spur gear 302 secured to the outboard end of a horizontal, transverse shaft 303. The latter is suitably journaled upon the horizontal top plate 48 of the machine frame as best seen in Figs. 2, 4, 3 and 5.

Figure 2:
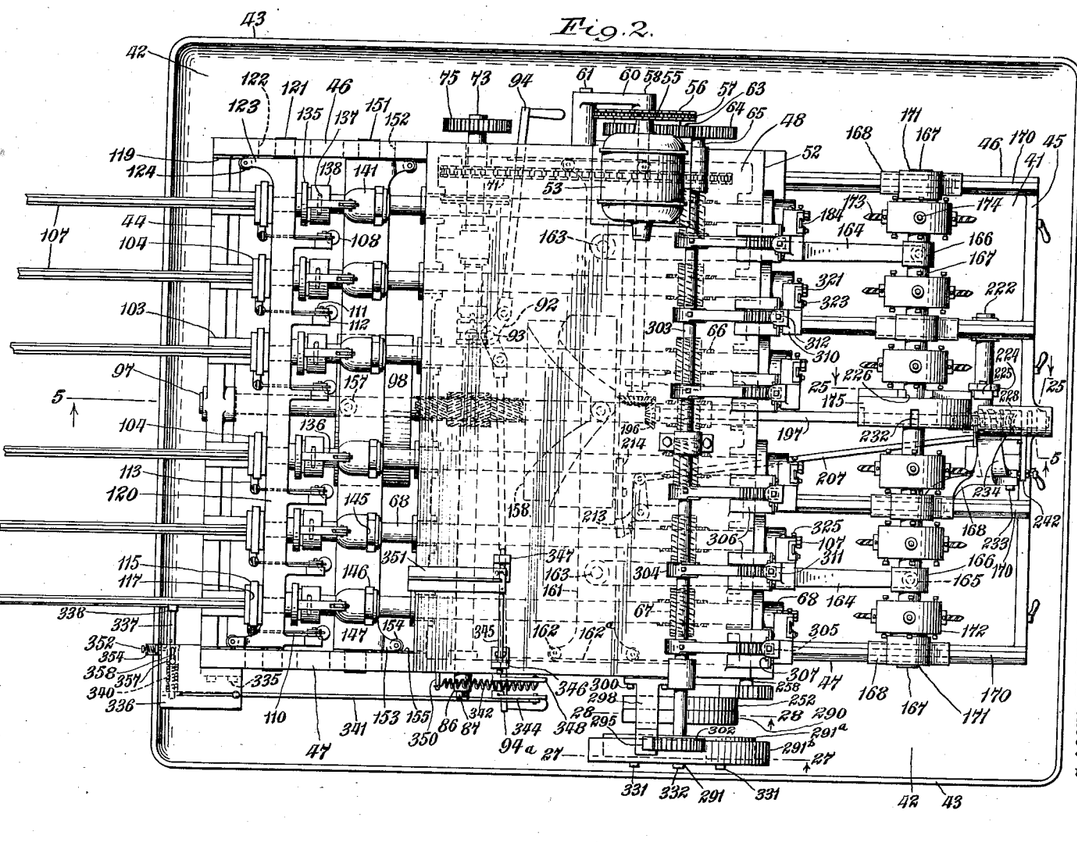
Figure 2 is a diminutive top plan thereof.
Figure 3:
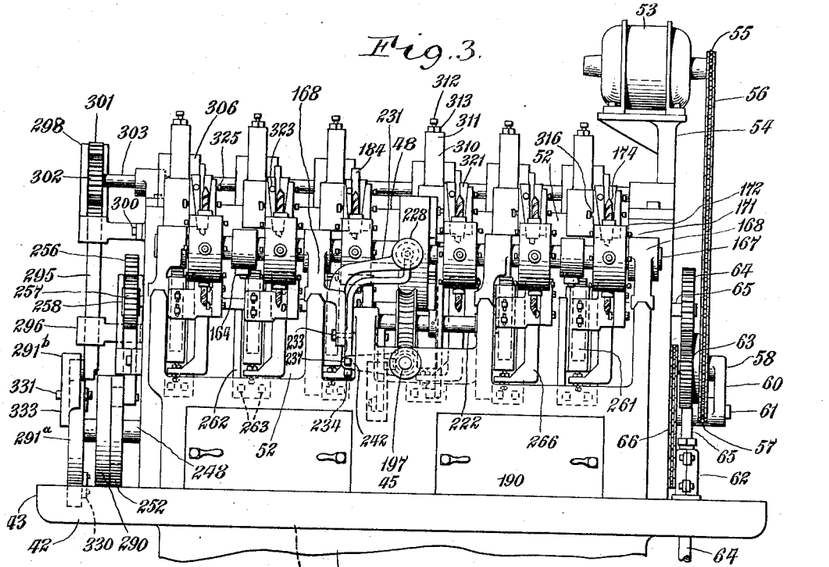
Figures 3 and 4 are diminutive front and rear end elevations of the screw machine with a portion of the base broken away.
Figure 4:
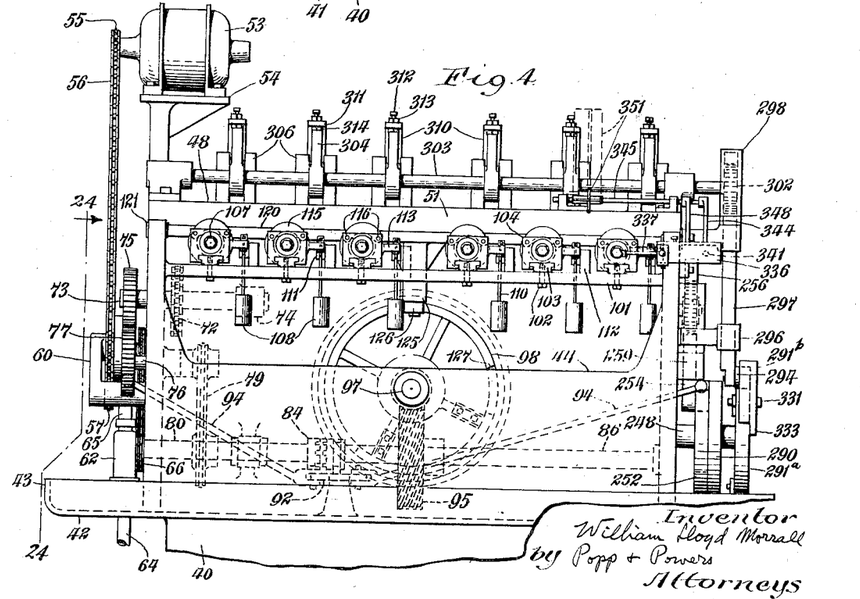

Secured to said shaft 303 and arranged above and to one side of each of the several spindles 68 are a plurality of companion gear segments 304 whose teeth mesh with companion secondary racks 305 (see particularly Figs. 5, 2 and 15). Each of the latter is vertically slidable in the machine frame, being mounted in a pair of symmetrical bracket slides 305 which are formed with and project upwardly and forwardly from the top plate 48 of the machine frame and are provided with vertical, square-shouldered grooves 307 which slidably receive vertical, square faced ribs 308 formed on each of their companion secondary racks 305. Mounted upon the front face of each secondary rack 305 and vertically adjustable relatively thereto is a cut-off tool plate 310 provided at its upper end with a horizontally and rearwardly projecting arm 311 which slidably receives the shank of a vertical adjustment stud bolt 312. Threaded upon said stud bolt are a pair of upper and lower lock nuts 313 and 314 which bear against the upper and lower faces respectively of said arm 311. By slackening one of said lock nuts and then tightening the other, cut-off-tool plate 310 may be vertically adjusted with respect to its companion rack 305 similarly to the vertical adjustment of each of the forming-tool adjustment plates 266 relatively to their companion forming-tool racks 261.

Secured to each of said tool plates 310 and horizontally and longitudinally adjustable relatively thereto is a cut-off-tool holder 315, the connection between it and its companion tool plate being analogous to the longitudinally adjustable connection between the forming tool holder 273 and the adjustment plate 266 heretofore described, i. e., each cut-off-tool holder 315 is provided with a square-faced rib 316 (see Fig. 15) which is longitudinally slidable in a square shouldered groove 317 formed horizontally and longitudinally on the one face of its companion cut-off-tool plate 310. Clamping of each tool holder 315 to its companion tool plate 310 in its proper adjusted position is effected by a companion suitable clamping bolt 318.

Formed vertically in each cut-off-tool holder 315 is a V shaped clamping slot 320 which opens forwardly. Bearing laterally with its opposite sides against the inclined side walls of each clamping slot 320 is a wedge block 321 which is vertically split and suitably grooved on its vertical front face to receive a square cutting bar or cut-off tool 184. The wedge block 321 is secured to the tool holder 315 by a clamping cap screw 323 which is threaded into said tool holder 315 and passes through a suitable slot 324 in said wedge block 321 so as to permit the latter to be moved vertically and thereby enable the same to accommodate different thicknesses of cutting-off tools 184. Final clamping of each cutting-off tool in its wedge block 321 is accomplished by a pair of jam screws 325 which are threaded horizontally and transversely through one of the sides of each tool holder 315 and bear with their inner ends against the adjacent inclined face of the wedge block 321.

This construction in general permits the use of cut-off tools 184 (of square rod or bar stock) of different thickness and also permits each cut-off tool to be independently adjusted either vertically, horizontally or longitudinally with respect to its companion tool plate 310 and also permits the latter, together with the wedge block 321 and its cut-off tool 184 to be adjusted vertically relatively to its companion secondary rack 305. This latter vertical adjustment can be more easily controlled within finer limits than can the vertical adjustment of the cutting-off tool 184 itself relatively to its tool holder 315, this last named adjustment being merely a coarse vertical adjustment to roughly compensate for the variation in length of the cutting-off tool 184 caused by the successive re-grindings thereof, it being desirable (in order to prevent chattering of the cutting-off tool) to have the point of said cutting-off tool project the smallest possible distance below the bottom of the wedge block 321 consistent with adequate chip clearance and clearance of the parts in general. The use of cut-off-tools 184 which are distinct from and are actuated independently of the forming tools 180 permits of a much higher cut-off speed than is possible where the cut-off and forming operations are performed by one combined cutting tool. The production cost is also less both as to breakage of the tools and as to the frequency of regrinding.

It will be noticed that the cam actuation of the several cut-off tools 184 is similar to the cam actuation of the forming tools 180, in that a slight rotation of the cut-off-tool cam 291 beyond the position illustrated in Fig. 27 causes a rapid rise or outward movement of the roller 294 along the advancing steep cam slope 326 and hence also a rapid lowering of the several cut-off-tools 184, whereby the latter are brought almost into contact with the bar stock 107. Thereupon the roller continues to rise or move outwardly very gradually as it travels along the spiral feed-in cam face 327 and thereby causes the cut-off tools 184 to gradually feed down into the bar stock 107. When the cutting-off operation has been completed and the roller 294 has reached the end of the spiral feed-in cam face 327, it moves rapidly inwardly down a retractive, steep cam slope 328 so as to rapidly retract the cut-off tools to a position considerably removed from the bar stock. The roller then travels for a time along the neutral or concentric cam face until it again reaches the advancing cam slope 326. This arrangement prevents any possible jamming of the several completed work pieces (nuts 176) as they are severed from their companion lengths of bar stock 107 and also permits of adequate space for the gauging of the partly finished product when making a set-up.

As in the case of the forming-tool cam 252, the cut-off-tool cam 291 is analogously made up of cam sections 291a and 291b (see Figs. 27, 1, 2, 3, and 4) both of which are detachably secured to a disk 329 which in turn is secured to the shaft 248. This construction enables these cam sections to be replaced by cam sections of different contour for different sorts of set-ups. The disk 329 is provided on its rear face with three straps 330 which are secured to the rear face of the inner cam section 291a by a pair of bolts 331 and another central, supplemental bolt 332. The outer cam section 291b is segmental, being only required to bear against the roller 294 at those points in its travel where said roller moves downwardly (i. e., inwardly) or where it is necessary to prevent said roller from jumping off from the face of the inner cam section 291 when said roller is very rapidly moved outwardly. The outer cam section 291b is provided on its outer edge with a vertical, inwardly projecting flange 333 which bears against the outer vertical face of said disk 329 and is secured thereto by the aforementioned bolts 331 and supplemental central bolt 332. When it is desired to alter the cam action of this cut-off-tool cam 291, the two inner and outer cam sections 291a and 291b respectively are removed from the cam disks 329 and are replaced by a pair of different cam sections having the desired different contour.

*Bar stock replenishing signal*

Arranged upon the upper, rear corner of the side wall 47 of the machine frame (see Figs. 2, 1, 22, 23 and 4) and secured by machine screws 335 thereto, is a bracket 336 which is horizontally and transversely bored to slidably receive a plunger 337 carrying at its inner end a head 338 which is normally and resiliently pressed against the side of the outermost of the lengths of bar stock 107 by a compression spring 340.

Under normal operating conditions, all of the lengths of bar stock are of the same length so that, for all practical purposes, a suitable indication of the longitudinal position of this outermost length or piece of bar stock 107 is an indication of the longitudinal position of all of the lengths of bar stock, and they may therefore be treated collectively. As the several lengths of bar stock successively move forwardly through their companion spindles 68, there comes a time when their rear ends have moved sufficiently forwardly so that the inner face of the plunger head 338 of the plunger 337 is back of the rear face of the outermost or adjacent bar stock. This allows said plunger 337 to be moved inwardly under the influence of the compression spring 340. This inward movement of said plunger causes its outer end to move out of the path of a push rod 341 which is arranged horizontally and longitudinally slidably in the bracket 336 and is resiliently urged rearwardly by a tension spring 342.

The front end of said push rod is slidably received within a slot 343 of an arm 344 whose hub is suitably secured to the outboard end of a horizontal, transverse signal shaft 345. The latter is suitably journaled in bearings 346 and 347 which are mounted upon and secured to the top plate 48 of the machine frame. Also secured to said signal shaft and near its outer end is a spring arm 348 whose outer end is pivotally connected with the front end of the tension spring 342 aforementioned, the rear end of said spring being secured to the machine frame upon a suitable post 350 extending horizontally and transversely outward from the side wall 47 of the machine frame. Secured to the inner end of said signal shaft 345 is an indicating semaphore or metal signal flag 351 which is of + shaped cross section so as to be easily visible from either the front or the side of the machine when in its raised position as indicated by dotted lines in Fig. 1. The raising of this signal flag 351 occurs whenever the rear end of the outermost length of bar stock 107 passes forwardly beyond the head 338 of the plunger 337. This acquaints the operator with the fact that he is to feed additional lengths of bar stock 107 into the rear ends of the pusher tubes 105 if he desires to keep the machine in continuous operation.

Before inserting into its companion pusher tube 105 the outermost of the lengths of bar stock 107, it is necessary to push the plunger head 338 and plunger 337 back out of the way. This may be accomplished by merely holding the said plunger back manually against the pressure of its compression spring 340, but it is preferred that the more convenient arrangement illustrated be employed. This consists in providing a spring depressed detaining rod 352 which is slidably arranged horizontally and longitudinally at the inner rear corner of the bracket 336 and is urged resiliently forwardly by a compression spring 353. The latter bears at its rear end against a sheet metal bracket 354 which is secured to the main bracket 336 and bears at its front end against a collar 355 secured to the detaining rod 352. In the position shown in Fig. 22, this detaining rod 352 merely bears with its front end against the plunger 337 and does not prevent the longitudinal movement of the same. If, however, said plunger be manually retracted beyond the position shown in Fig. 22, the nose of said plunger will drop into a detaining notch 356 formed in the one side of said plunger 377. The latter is prevented from turning and is also rendered conveniently retractable by the provision of a draw-back knob 357 (see Figs. 23, 1, 2 and 4) which is secured to said plunger and extends up through a horizontal slot 358 formed in the bracket 336. After the longitudinal push rod 341 has been returned to its normal forward position and the plunger 337 pulled back and the detaining rod 352 resiliently pushed into the detaining notch 356 so as to hold back said plunger 337, then additional lengths of bar stock 107 may conveniently be slid forwardly into the several pusher tubes 105. The detaining rod 352 is then retracted, whereupon the plunger 337 moves outwardly until it and the other parts again assume the full line position of Fig. 22. In this position the signal flag 351 lies down inconspicuously upon the top plate 48 of the machine frame but is ready to rise again whenever the lengths of bar stock 107 need replenishing.

I claim as my invention:

1. A screw machine comprising a frame; a plurality of spindles arranged in a single plane and provided with means for chucking bar stock therein and rotatably mounted in said frame; a pusher tube arranged in each spindle, means for independently moving forwardly each pusher tube axially; means for positively and simultaneously retracting all of said pusher tubes, means for rotating said spindles; and means for machining the exposed ends of said bar stock.

2. A screw machine comprising a frame; a plurality of spindles arranged in a single plane and provided with means for chucking bar stock therein and rotatably mounted in said frame; a pusher tube arranged in each spindle; a feed out carriage detachably connected to each pusher tube; independent means for longitudinally moving each of said carriages forwardly; means for positively and simultaneously retracting all of said carriages; and means for rotating said spindles and machining the exposed ends of said bar stock.

3. A screw machine comprising a frame; a plurality of spindles arranged in a single plane and provided with means for chucking bar stock therein and rotatably mounted in said frame; a pusher tube arranged in each spindle; a feed out carriage detachably connected to each pusher tube; an adjustable cam arranged to simultaneously actuate all of said feed out carriages; means for rotating said cam and said spindles and means for machining the exposed ends of said bar stock.

4. A screw machine comprising a frame; a plurality of spindles arranged in a single plane and rotatably mounted in said frame; a collet arranged in each spindle; a clutch carriage; a clutch arranged to draw back each collet and independently and detachably connected with said clutch carriage; means for actuating said clutch carriage and rotating said spindles; and means for machining the exposed ends of said bar stock.

5. A screw machine comprising a frame; a plurality of fixed center spindles provided with means for chucking bar stock therein and rotatably mounted in said frame; a Geneva carriage having an index head arranged in front of each spindle; end cutting tools arranged in said index heads; means for indexing said index heads; a pusher tube arranged in each spindle; means for longitudinally and independently moving said pusher tubes forwardly until the lengths of bar stock are brought into contact with the noses of said cutting tools; and means for moving said Geneva carriage and for rotating said spindles.

6. A screw machine comprising a frame; a spindle rotatably mounted therein and adapted to receive a length of bar stock; a Geneva carriage longitudinally slidable in said frame; a Geneva wheel having radial runways and rotatably mounted in said Geneva carriage; an index head connected with said Geneva wheel and having an end cutting tool; a Geneva-turning shaft journaled in said frame; means for rotating said shaft synchronously with the longitudinal movement of said Geneva carriage; a two armed yoke secured to said Geneva-turning shaft and arranged to successively partially rotate said Geneva wheel by bearing against the sides of its runways with the alternate arms of said yoke; means for concomitantly indexing said Geneva wheel; means for moving said Geneva carriage toward and from the spindle; and means for rotating said spindle.

7. A screw machine comprising a frame; a spindle rotatably mounted therein and adapted to receive a length of bar stock; a Geneva carriage longitudinally slidable in said frame; a Geneva wheel having radial runways and rotatably mounted in said Geneva carriage; an index head connected with said Geneva wheel and having an end cutting tool; a Geneva-turning shaft journaled in said frame; means for rotating said shaft synchronously with the longitudinal movement of said Geneva carriage; a two armed yoke secured to said Geneva-turning shaft and arranged to successively partially rotate said Geneva wheel by bearing against the sides of its runways with the alternate arms of said yoke; an index pin slidably mounted in said Geneva carriage and arranged to index said Geneva wheel; a disengaging lever pivoted to said Geneva carriage and actuated just prior to the rotation of said Geneva-turning shaft and operating to thereby withdraw said index pin; and means for rotating said spindle.

8. A screw machine comprising a frame; a spindle rotatably mounted therein and adapted to receive a length of bar stock; a Geneva carriage longitudinally slidable in said frame; a Geneva wheel having radial runways and rotatably mounted in said Geneva carriage; an index head connected with said Geneva wheel and having an end cutting tool; a Geneva-turning shaft journaled in said frame; a constant speed shaft; a driving gear; a clutch arranged to connect said worm with said constant speed shaft and actuated synchronously with the movement of said Geneva carriage; a driven gear meshing with said driving gear and connected with said Geneva-turning shaft; a two armed yoke also connected with said Geneva-turning shaft and arranged to successively partially rotate said Geneva wheel by bearing against the sides of its runways; an index pin mounted in said Geneva carriage; means for retracting said pin upon the engagement of aforesaid clutch; and means for rotating said constant speed shaft and the spindle.

9. A screw machine comprising a frame; a spindle rotatably mounted therein and provided with means for chucking bar stock therein; a Geneva cam; a Geneva carriage longitudinally slidable on said frame toward and from said spindles and actuated by said Geneva cam; a clutch cam secured to said Geneva cam and removable therewith; a two armed yoke rotatably arranged on said frame and actuating said Geneva wheel; a clutch connected with said yoke and controlled by said clutch cam; and means for rotating said Geneva cam and said spindle.

10. A screw machine comprising a frame; a spindle rotatably mounted in said frame and provided with means for chucking bar stock therein; means for progressively moving said bar stock forwardly intermediate of each chucking operation; a plunger bearing resiliently against the rear end of said bar; a signal flag mounted on said frame and arranged to be raised when the back end of said bar stock passes said plunger and allows the latter to move forwardly; means for rotating said spindle; and means for successively machining the successive projecting ends of said bar stock.

11. A screw machine comprising a frame; a barrel-cam shaft journaled thereon; a spindle rotatably mounted in said frame and provided with means for chucking stock therein; means for variously machining the exposed end of said stock by mechanism controlled by said barrel-cam shaft; a source of power; a clutch completely connecting said source of power with said barrel-cam shaft; means for controlling said clutch from either side of the machine; and means for rotating said spindle.

WILLIAM LLOYD MORRALL.